Sept. 11, 1956 M. S. KIRCHER 2,762,765
METHODS AND APPARATUS FOR ELECTROLYTIC DECOMPOSITION
Filed June 6, 1951 9 Sheets-Sheet 1

INVENTOR.
MORTON S. KIRCHER
BY Peter F. Casella
his agent

Sept. 11, 1956 M. S. KIRCHER 2,762,765
METHODS AND APPARATUS FOR ELECTROLYTIC DECOMPOSITION
Filed June 6, 1951 9 Sheets-Sheet 2
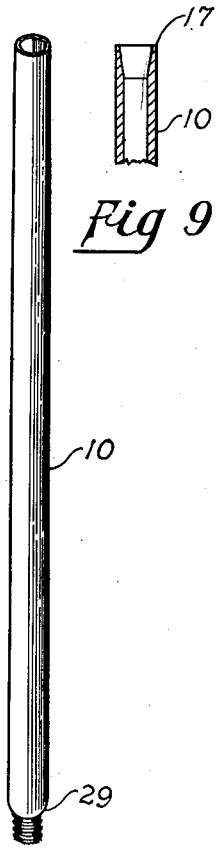
Fig 8
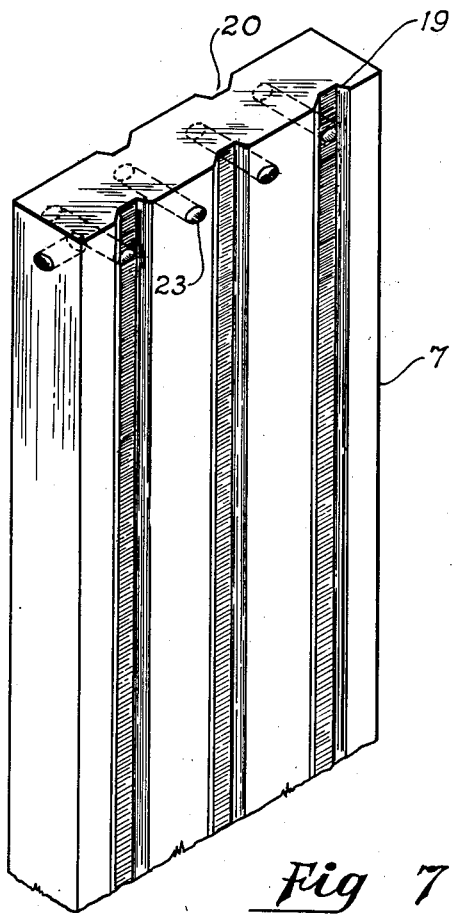
Fig 9
Fig 7
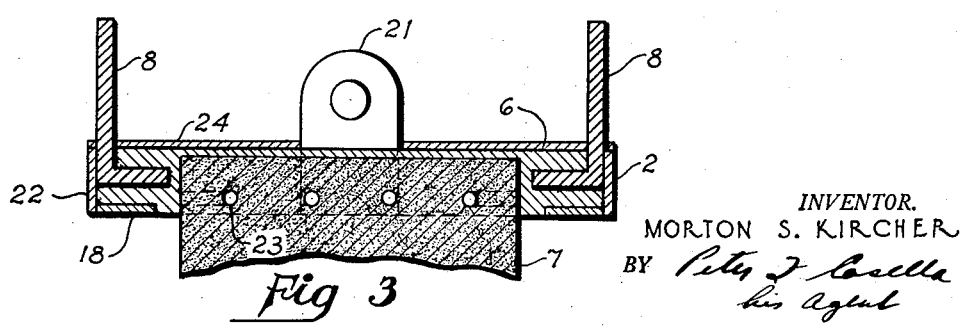
Fig 3
INVENTOR.
MORTON S. KIRCHER
BY Peter F. Casella
his Agent Sept. 11, 1956 M. S. KIRCHER 2,762,765
METHODS AND APPARATUS FOR ELECTROLYTIC DECOMPOSITION
Filed June 6, 1951

INVENTOR.
MORTON S. KIRCHER

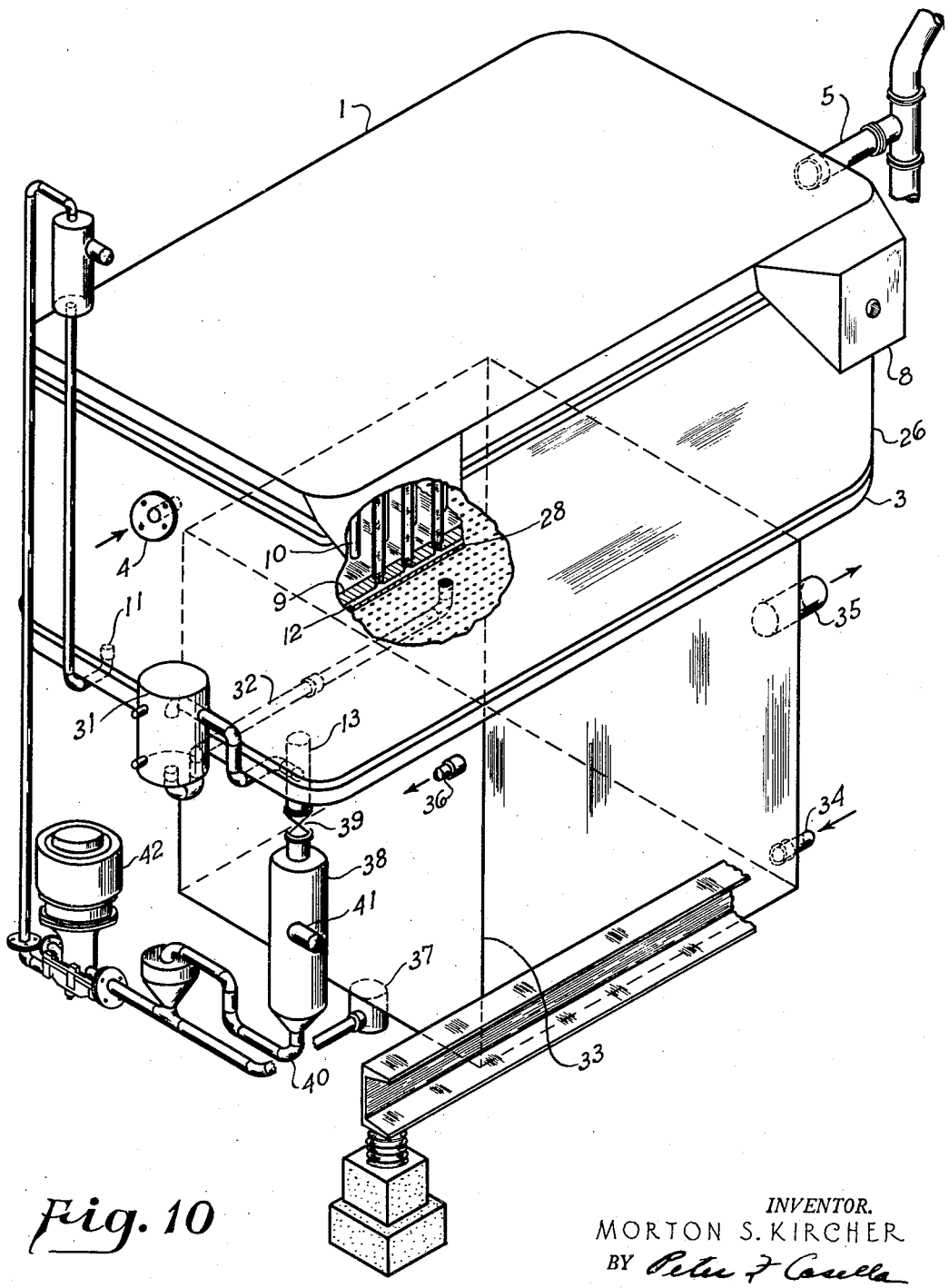

Sept. 11, 1956   M. S. KIRCHER   2,762,765
METHODS AND APPARATUS FOR ELECTROLYTIC DECOMPOSITION
Filed June 6, 1951   9 Sheets-Sheet 9

INVENTOR.
MORTON S. KIRCHER
BY Peter F Carella
his agent

United States Patent Office 2,762,765
Patented Sept. 11, 1956

2,762,765

METHODS AND APPARATUS FOR ELECTROLYTIC DECOMPOSITION

Morton S. Kircher, Niagara Falls, N. Y., assignor to Hooker Electrochemical Company, Niagara Falls, N. Y., a corporation of New York Application June 6, 1951, Serial No. 230,231

14 Claims. (Cl. 204—125)

This invention relates to methods and apparatus for effecting the electrolysis of aqueous electrolyte such as alkali metal halide solutions or brines. Still further this invention relates to methods and apparatus for the electrolytic decomposition of an aqueous brine containing sodium chloride to produce free chlorine and sodium amalgam particularly in a mercury cathode cell of the vertical type.

The vertical arrangement, i. e., where the effective anode and cathode areas are disposed in a vertical position, in an electrolytic mercury cathode cell, is preferred to the horizontal arrangement, primarily because the former provides for the conservation of floor space, with all of the attendant advantages, and accompanying high unit production, while minimizing the necessity for precision construction, installation and maintenance.

It is an object of this invention to provide economical methods and apparatus for the electrolytic decomposition of alkali metal halide brines to produce free halogen and alkali amalgam, in a mercury cathode cell of the vertical type. Another object of this invention is to provide methods for increasing the current efficiency of vertical type mercury cathode cells. Still another object is to provide methods for decreasing the voltage requirements of vertical type mercury cathode cells. Other objects of the invention, particularly in the electrode structures interposing separate groups of cathodes between spaced anodes will become apparent from the following specification taken in connection with the accompanying drawings in which:

Figure 3 is a section of the top of the cell taken along the line b—b in Figure 1.

Figure 7 is a perspective view of one of the anodes.

Figure 8 is a perspective view of one of the cathode supports.

Figure 9 is a section of modified cathode support top.

Figure 10 is a perspective view showing one advantageous vertical layout of a mercury cathode cell with parts cut away to expose features of internal construction, a decomposer, means for flushing out the cell, and other accessory equipment, all in accordance with this invention.

I. THE CELL

Figure 2:
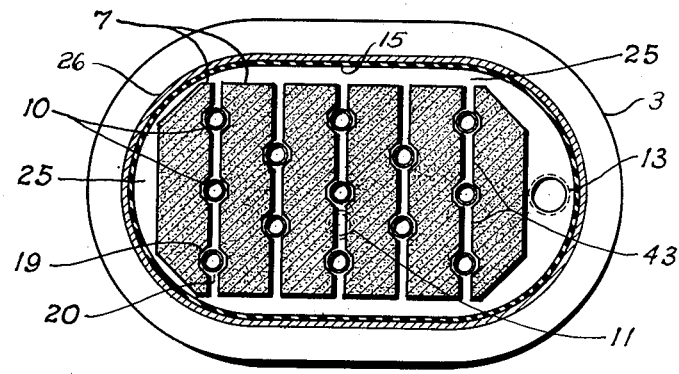
Figure 2 is a section of the cell along the line a—a in Figure 1.
Figure 1:
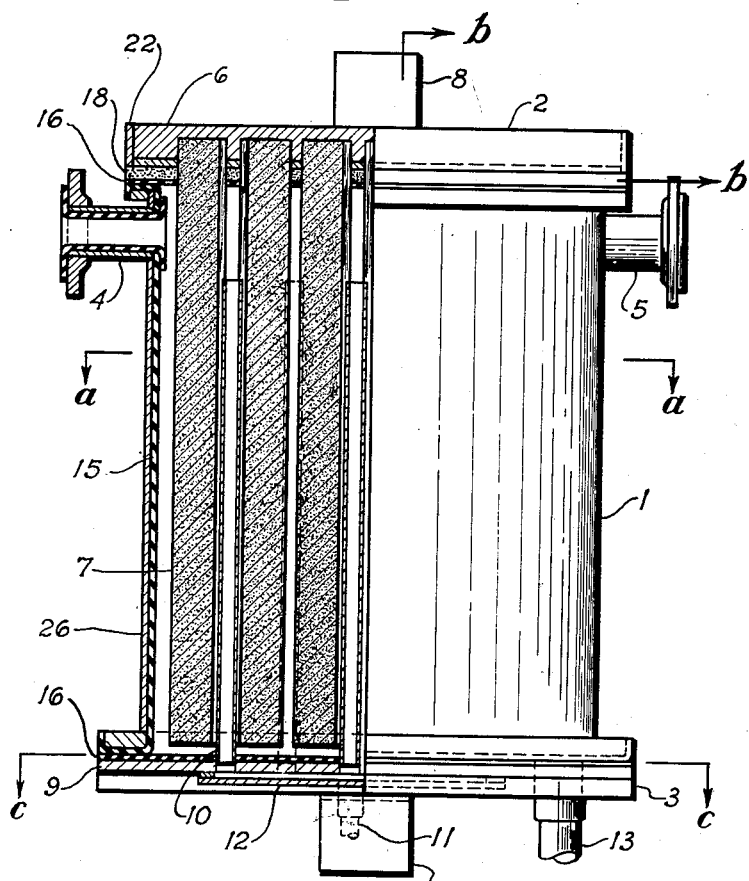
Figure 1 is a front elevation, partially in section to show the interior construction, of a typical mercury cathode cell of this invention.

Referring to the figures, particularly Figures 1 and 2: The cell comprises: a body 1 which includes, an inlet 4, for introducing brine into the cell and a combination outlet and overflow 5, for removal of gaseous chlorine and overflow of brine from the cell; a top 2 which includes a removable cover and means 6, for securing the vertical anodes 7, an anode post 8 for making connection to the electrical circuit; and a bottom 3 which includes, a supporting base not shown, a cathode base plate 9 which holds the vertical tubular cathode supports 10, an inlet 11 for introducing mercury into the cell, a mercury manifold 12, an amalgam outlet 13, and a cathode post 14 for making connection to the electrical circuit; said three basic parts being fitted together to make a pressure liquid-tight container.

The body 1 is an approximately oval, square or rectangular shaped vertically disposed shell 26 preferably made of steel which is lined at 15 with rubber or is molded from hard rubber or other material resistant to wet chlorine and brine. The brine inlet 4 is located near the top of the body 1 opposite the combination chlorine-brine outlet 5. The outlet 5 is located near the top of the body 1 and is arranged and located to provide for control of the brine level in the cell.

The top or cover 2 is fitted to the body 1 through a gasket 16 to make a pressure-tight fitting and may be secured mechanically by C-clamps not shown. The anodes 7, to be described in detail later, suspend vertically and perpendicularly from the flat surface of the cell top or cover 2, and extend to the bottom of the cell short of touching the bottom amalgam surface. The amalgam leaves the cell through outlet 13 during operation of the cell. The anodes 7 are composed of graphite and are held in a casting of lead 6 inside the frame 22 of the cover, said metal providing for electrical contact between the anodes 7 and anode post 8. The inside surface of the cover 2 is protected from the chemical and electrolytic attack by being coated with a layer of bitumen 18. The anodes 7 contain vertical grooves 19 adapted to enclose the cathode supports 10 in a manner which is important in the practice of my invention.

The bottom 3 comprises a manifold 12, the top surface of which is the smooth cathode base plate 9, which contains steel tubes or cathode supports 10 which are fastened thereto at cathode post seats 27, and project vertically upward to a point below the brine overflow level into chambers or channels 20 formed between grooves 19 of two adjacent anodes 7—7. The cathode connection is made through the cathode post 14 which is secured to the bottom 3 of the cell. A mercury inlet 11 is positioned on the bottom plate 28 of the manifold 12 so that when mercury is introduced into the cell it is evenly distributed by the manifold 12, into each of the steel tubes 10, for instance ordinary black iron pipe used in pipe fitting, the outer smooth surfaces of which form a support for the mercury film flowing over the top of the tubes. A mercury or amalgam outlet 13 is located on the upper surface of the cathode base plate 9 of the manifold 12 to provide for continuous withdrawal of amalgam from the cell and allow for a continuous film of mercury or amalgam remaining on the surface of the cathode base plate 9. The amalgam outlet 13 communicates with a trap shown in Figure 10 which allows for continuous washing of the amalgam and flushing out of the cell without interruption during operation, as will be described later.

An outstanding feature of this construction is the provision of spaced vertical anodically active surface strips 43 in pairs facing each other across the electrolyte between the anodes 7. The electrolyte between each pair of strips 43 forms a vertical rising column sweeping upward along these anode strips from bottom to top and there are a plurality of these columns between each pair of anodes. Intervening between these electrolyte columns and spanning the strip pairs are the tubular columns of electrolyte surrounding and submerging the mercury cathodes around supports 10 and these columns of electrolyte similarly sweep upward in the spaces between the cathodes and anodes which latter preferably are formed with the grooves 19 for these columns of electrolyte. The anode and cathode columns of electrolyte merge together in their upward sweep and the anode columns thus intervene between and connect and replenish the cathode columns forming a sheet extending continuously between the spaces at the vertical edges of the anodes. This strip or columnar upward circulation of the electrolyte around the spaced cathodes and between the anode surfaces is very effective in maintaining efficient and dependable conditions of electrolysis providing an adequate supply to the concentrated activity at the cathode surfaces and applying the buoyant effect of the rising gases most advantageously for a rapid circulation of the electrolyte when in combination with downward columns 25 which are in communication at both the top and bottom of the cell.

In order that my new and novel method for effecting the new electrolysis of alkali metal halide brines may be more readily understood, the preferred mode of operating the cell just described, the details of which will also be further amplified by the following disclosure, will be given next; however, I do not intend to be limited thereto, as various modifications are contemplated as falling within the scope of my invention.

II. OPERATION OF THE CELL

An aqueous sodium chloride brine containing preferably about 25 to 26 per cent sodium chloride, but which may be under-saturated or even contain undissolved salt, is continuously introduced into the cell through inlet 4. The brine is permitted to fill the cell to at least a height above the cathode supports, the tops of which are in substantially the same plane. The brine level is primarily determined by the height of the brine overflow exit 5, but may be adjustable by means for controlling the brine level not shown, thereby providing for an adjustable gas space between the top of the cell and the brine level. The exact location of the brine inlet is not critical, however, it should be so positioned in relation to the brine outlet so that there is a gradual decrease in concentration of the brine across the cell during operation, in the direction from the inlet to the outlet. Brine depleted in salt content by electrolysis is removed from the cell through outlet 5, and is resaturated and purified before being recycled to the cell. Mercury, or amalgam containing very low proportions of sodium which is recycled from a decomposition chamber shown in Figure 10, is continuously introduced into the cell by way of inlet 11, through manifold 12 and into tubes 10 from the tops of which it overflows. The manifold 12 is designed so that the pressure drop due to friction of flow is negligible, thus, each tube or cathode support is supplied with mercury at substantially the same pressure. Since the tops of the mercury cathode supports are each in substantially the same plane, and because of the manifold means for equal distribution of pressure in the mercury feed to be described in detail hereinafter, the rate of flow of mercury over a unit length of the weir type edges 17 of the cathode supports is substantially the same on each of the cathodes.

Direct current is applied to the cell through the anode post 8 and cathode post 14, to cause the electrolysis of the sodium chloride brine. The chloride ion is discharged from the electrolyte at the graphite anodes 7 to produce chlorine gas which bubbles up through the brine in the inter-electrode spaces 20 into the gas space at the top of the cell. The gaseous chlorine formed is removed from the cell through outlet 5. The sodium ion is discharged on the mercury descending on the cathode supports, forming a sodium amalgam which is removed from the cell through outlet 13, said outlet 13 being provided with means for maintaining the cathode base plate 9 covered with mercury or amalgam during operation. The outlet 13 preferably connects with means for continuously washing the amalgam and means for flushing the cell during operation whereby accumulated deposits may be conveniently removed, said means being shown in Figure 10. The mercury or amalgam flows over the top 17 of each cathode support at substantially the same uniform rate and during operation forms a continuous thin film on each of the cathode supports. It is essential for successful operation and performance of my cell that said film be continuously maintained during electrolysis, i. e., each cathode support must be substantially completely wetted with mercury or amalgam. It should be noted that without a flow of current, the mercury does not satisfactorily wet the steel cathode supports, however, by proper design and operation in accordance with my teachings, substantially complete coverage of the cathode supports by mercury is obtained. Some variation in rate of amalgam descension among the plurality of tubular cathode supports is tolerated without significant sacrifice, for instance, if the rate of flow on one tube is double that of the average of all the others in the cell, no serious effects in the performance of the cell will be evidenced; however, it is preferable to maintain a substantially uniform mercury flow rate over and down each cathode support. Means for accomplishing this objective will be described in detail hereinafter. Thus, during electrolysis in my cell, the mercury overflowing on the cathode supports, which are preferably made of steel, forms a thin continuous film thereon; the mercury becomes amalgamated, with the concentration of sodium in the amalgam increasing with descension on the cathode supports; then the amalgam so formed, flows across the level or slightly inclined cathode base plate 9 to the amalgam outlet 13, and is removed from the cell. The amalgam recovered is denuded to form caustic soda and hydrogen, then recycled to the cell.

The performance data in the following examples is typical of that accumulated by operating various designs of cells, embodying the features of my invention, having a cathode two feet high, in a manner after the foregoing description under "II. Operation of the Cell."

III. TYPICAL OPERATING PERFORMANCE

| | Ex. I | Ex. II |
|---|---|---|
| (1) Volts: | | |
| (a) at cathode CD given under (3) | 3.93 | 4.30 |
| (b) at cathode CD 200 amps./sq. ft | 3.50 | 3.40 |
| (c) at cathode CD 400 amps./sq. ft | 4.00 | 3.78 |
| (d) at cathode CD 600 amps./sq. ft | 4.52 | 4.15 |
| (2) Current density at anode, amps./sq. ft | 105 | 105 |
| (3) Current density at cathode, amps./sq. ft | 370 | 685 |
| (4) Ratio of cathodic to anodic current density | 3.5 | 6.5 |
| (5) Current efficiency, percent | 95 | 95 |
| (6) Power efficiency, percent | 56 | 50.5 |
| (7) Temperature, degrees centigrade | 95 | 95 |
| (8) Electrolyte concentration, gms. NaCl/liter | 250–270 | 250–270 |
| (9) Gas analysis: | | |
| (a) percent chlorine plus carbon dioxide | 99.5 | 99.5 |
| (b) percent hydrogen | 0.5 | 0.5 |
| (10) Amalgam concentration, percent Na | 0.1 | 0.2 |
| (11) Chlorine per day per sq. ft. of floor space, pounds (cell only, not including decomposer or aisles) | 75 | 75 |
| (12) Same as 11 including space for decomposer, aisles and accessory equipment | 25 | 25 |
| (13) Percent NaOH | 50 | 50 |

The foregoing typical performance data given in Examples I and II, for cells of this invention, as compared for instance to typical performance for a conventional horizontal type mercury cell and the rotating disc type vertical cell, show that this invention provides a vertical mercury cell which obviates the disadvantages associated with horizontal mercury cell installations, without sacrifice of the many desirable operating features connected with horizontal mercury cells, and which is superior in performance and in economic utilization as compared to known vertical cells. Example I gives typical performance data for a preferred cell embodied within my invention, and Example II is for a similar cell except that one-half the number of cathode tubes were used, thereby providing for operation at a higher ratio of cathode to anode current density. These examples illustrate that the cathode current density can be increased from about 370 to 685 amperes per square foot in cells of this invention, with only a minor increase in voltage being associated therewith. It should be noted that over and above the ordinary performance of horizontal and/or previous vertical mercury cathode cells, the cells of my invention provide for lower voltages, higher current efficiencies, higher power efficiencies, and lower contamination of chlorine with hydrogen, in addition to providing for vast savings in floor space. Note that approximately 75 pounds of chlorine per cell per day per square foot of floor space is produced by a cell of this invention. When taking into account the total floor space including aisles, and all the accessory equipment necessary in a commercial cell house installation, the figure becomes 25 pounds of chlorine per cell per day per square foot of floor space for the cells of my invention; thus, for a given production rate, my cells occupy only a fraction of the floor space of prior mercury cathode cells.

IV. THE CELL DESIGN AND OPERATION

(a) Ratio of current densities

The rapid and concentrated evolution of chlorine at the graphite anodes in chlor-alkali cells at high current densities such as 100 to 600 amperes per square foot of effective anode space tends to increase the electrical resistance of the cell, partly because the anode surface becomes covered with chlorine gas, thereby reducing its effective area, and also because, the electrolyte between the electrodes becomes filled with chlorine gas bubbles, thereby increasing its resistance. These effects are minimized in accordance with my invention by employing a current density on the anode which is relatively low both with respect to the cathode current density and with respect to the current density employed in cells of the horizontal type, and, by employing a rapid upward flow of brine past the anode.

(b) Electrolyte flow

The rapid upward flow of electrolyte or brine is believed to cause decreased voltage due to two effects: (1) by increasing the rate of brine flow with respect to the rate of chlorine evolution, the volume of gas per volume of liquid is decreased thus resulting in increased brine conductivity, and (2) by increasing the rate of brine flow past the anode, chlorine bubbles are swept off the anode more rapidly thus increasing the area of anode surface available for electrolytic action.

I have found that endogenous circulation of electrolyte may be maintained at high velocities in vertical mercury cells by providing proper spacing in the channels (also called inter-electrode spaces) between the anodes and cathodes, and providing for communication of the electrolyte in these channels, both at the top and the bottom of the cell, with a column of electrolyte which is outside the zone of electrolysis, for example, with the column of electrolyte in the space provided between the anodes and the shell of the cell, or, in a space provided between anode groups (also referred to as "return column space"). Still further, I have found that in such electrolytic cells providing for endogenous maintenance of high electrolyte velocity, the ratio of inter-electrode or channel spacing to the spacing between the electrodes and the shell of the cell, and/or the space between anode groups, referred to as return column spacing, is a critical variable which must be maintained above certain limits in order to realize optimum results in accordance with my invention, as will be shown hereinafter with reference to the description of Figures 18 and 19.

Three separate effects tend to promote the endogenous maintenance of high electrolyte velocity, upward between the electrodes, in this invention: (1) the specific gravity of the brine between electrodes is lower than the specific gravity of the brine in the return column space and hence tends to be displaced by the brine in the return column; (2) the mixture of gas and brine in the inter-electrode or inner channels has a lower specific gravity than the gas-free brine in the return column space hence the brine in the return column tends to replace the brine in the inner channels causing upward flow; (3) the rise of chlorine gas bubbles through the inner channels tends to move brine in upward direction by frictional force.

Various factors limit the maximum electrolyte velocity that may be attained endogenously in a given cell designed in accordance with this invention. In a cell having a fixed ratio of return column space to inter-electrode space, the electrolyte velocity may be increased by increasing the electrical current impressed upon the electrodes, with accompanying increased chlorine liberation also being realized. However, due to the increased liberation of chlorine in such fixed spaces, the upper limit to the amount of current that may be impressed on such electrodes is theoretically conditioned by the ultimate fact that the inter-electrode space might be completely filled with gas, and is practically limited by my finding that economical operation cannot be realized with electrolyte which contains more than 25 per cent of its volume of gas because of increased electrical resistance and other factors. Also, with increasing electrolyte velocity, there is an increasing tendency for chlorine gas bubbles to be entrained in the electrolyte flowing down the return column, rather than to be released from the electrolyte at its surface, thereby counteracting the factors which favor increased electrolyte velocity. In addition, frictional resistance to the flow of the electrolyte is increased with increased velocity, and this imposes another limit on the maximum velocity attainable endogenously in any given cell having a fixed ratio of return column space to inter-electrode space.

In redesigning a given cell, frictional resistance to flow may be decreased, with the realization of increased volume flow rate of electrolyte which favors improved cell current efficiency, by increasing the cross-sectional area of the inter-electrode space and the return column space. The factors involved in providing for increased current efficiency, with respect to electrolyte flow rate, are believed to be attributable to first, increased linear flow rate of electrolyte whereby chlorine gas bubbles are quickly removed from the zone of electrolysis, and, second to increased volume flow rate of electrolyte whereby the volume of chlorine gas per unit volume of electrolyte is decreased. It is not practical to decrease resistance to flow by increasing the distance between the anode and cathode beyond certain limits, because of the increased voltage which would be required to cause passage of the electrical current. However, I have found that it is practical to accomplish these objectives by increasing the cross-sectional area of the return column space without increasing the distance between the anode and cathode beyond the critical limit. There is a practical upper limit on the maximum ratio of return column space to inter-electrode space which is economical for commercial operation, which is conditioned by increasing construction costs. It is therefore important, in designing electrolytic cells which are to allow for endogenous maintenance of electrolyte flow at high velocities, whereby high current efficiencies may be realized, to have the distance between the anode and cathode not exceed values which are consistent with allowing for low voltage; however, it is possible to increase both the volume flow rate of electrolyte and linear flow rate of electrolyte in the inter-electrode spaces by increasing the cross-sectional area of the return column space.

It should be noted that a particular feature of this invention comprises the steps of effecting the electrolysis by maintaining the rapid upward flow of electrolyte endogenously at a high linear velocity in between a vertically disposed anode and a vertical downwardly flowing mercury cathode, while the current density on the cathode is greater than the current density on the anode whereby various advantages accrue as compared to maintaining said high electrolyte velocities in horizontal cells or in vertical cells not having said current distribution on the electrodes. The high cathodic current density with simultaneous low anodic current density is obtained by providing a large anode area with respect to the cathode area. A higher ratio of gas to liquid in the electrolyte near the anode is possible because the chlorine evolution at the anode becomes more effectively diffused in the electrolyte because of greater anode surface per unit of production. Also attack by chlorine on the amalgam is minimized because of the more effective diffusion of chlorine in the electrolyte which prevents large chlorine gas bubbles from forming. In addition, increased brine velocities are possible because the more effective chlorine diffusion in the electrolyte gives a larger specific gravity difference between the brine in the inter-electrode space and brine in the return column spaces. These high brine velocities in conjunction with relatively large anode areas as compared to the cathode area made possible higher current densities at a given voltage drop and the higher current densities favor higher brine velocities. It should be noted that as cathode area is increased with respect to the anode area the brine flow is slowed down and that under these conditions, the chlorine content of the brine is increased to very high values, whereby cell voltage is increased and attack on the amalgam is increased with concurrent decrease in current efficiency. Therefore, by maintaining high upward brine velocities in combination with a current density on the cathode greater than that on the anode, high current efficiency and low voltage are favored.

It is to be understood, however, that this invention includes maintaining the rapid upward flow of brine, at the high velocities which I have found so critical for successful performance in vertical mercury cells, by mechanical means such as by pumping the brine in an external piping circuit at high velocity to the cell, or by various other mechanical means.

At the cathode the principal reaction is the reduction of sodium ion at the cathode surface to form sodium and the simultaneous solution of the sodium to form an amalgam. This reaction is favored by having: (1) a high concentration of sodium ion in the brine; (2) a low concentration of impurities such as iron, chromium, cobalt, vanadium, magnesium, etc., in the brine; (3) a low concentration of sodium in the amalgam; and by (4) maintaining a cathodic current density above about 100 amperes per square foot.

(c) Concentration of electrolyte

In accordance with my invention, and contrary to the general teachings of the prior art, I have found that brine which is more depleted in sodium chloride content as compared to that in commercial prior art processes, may be successfully electrolyzed without incurring undue hydrogen formation at the cathode. Heretofore, the concentration of the effluent brine usually ran about 20 to 22 per cent sodium chloride; however, by maintaining a high circulation rate and orderly overall flow of brine from the inlet, upward and around the electrode spaces, and to the outlet, the electrolyte may be depleted to about 15 per cent sodium chloride content, without serious detriment of operating characteristics. It is not necessary that the gaseous chlorine and depleted brine be removed from the cell through the same outlet as shown in the drawings. This is a simple and convenient means for accomplishing these purposes, in that the number of outlets necessary in the cell is minimized, and also because it is possible to maintain a constant level of electrolyte in the cell by this means. Alternatively, however the chlorine outlet and brine outlet may be separate, or, they may be more elaborately designed to provide for control of the electrolyte level and gas space. During electrolysis, it is desirable to maintain the electrolyte at a high level so that the gas space above said level and below the top of the cell is kept at a minimum volume (without concurrently allowing for surges of gas or liquid) in order to reduce the hazard of explosion, should the hydrogen content of the gas come within the explosive range with chlorine, due to accident or mistakes during operation.

(d) The mercury flow

However, notwithstanding a design and operation of an electrolytic cell favoring the above factors, successful performance cannot be realized unless the cathode support remains substantially completely covered with a continuous film of mercury thereby preventing intolerable hydrogen formation, due to its liberation on the metallic support, which when made of steel has a lower overvoltage for hydrogen than mercury. It is believed that the reason vertical mercury cells, to which are attached the advantages of high unit production per unit area of floor space, have not been commercialized, is because the economic solution to this problem has not been offered prior to my invention.

The tubular mercury columns of this invention are of relatively small diameter and give a distributed concentration of the cathodic activity maintaining the high ratio of anode surface to cathode surface and at the same time when combined with channels 20 and return column spaces 25 allow for supplying the electrolyte between the cathode and anode surfaces in ideal rapid upward sweep with the intervening circulation between the anode surfaces acting to distribute the ions and rising gas most effectively for the generation and discharge of the chlorine.

Therefore, in accordance with my invention, the advantages of maintaining high cathodic current density, as herein referred to, are realized, without incurring the disadvantages associated with high anodic current density, but rather with realization of still other advantages, because of the simultaneous operation at lower anodic current densities, while also providing for factors which favor the formation and maintenance of a continuous film of mercury or amalgam on the supported cathode, which is so critical for the successful performance of a mercury cathode cell.

Heretofore, it has been known that a column of free falling mercury could only be maintained continuously by either limiting the height of the column or else by allowing the mercury to fall in a column or stream at a very high rate of flow sufficient to prevent dissemination into droplets; consequently, it has been proposed, in efforts to realize successful commercial vertical mercury cathode cells, to support the descending stream of mercury on a vertically disposed metallic plate. I have found that it is practically impossible to maintain a sufficiently uniform distribution of mercury over an area such as that exposed by a vertically disposed plate for a length of time adequate for commercial practicability, since if any part of the metallic cathode support becomes exposed (i. e., if the mercury does not flow continuously covering all of the cathode support surface) hydrogen will be produced during the electrolysis creating an explosion hazard. In addition, because of the surface tension of mercury, it is difficult to adequately maintain a uniform continuous film over such an area. It may be possible to flow mercury over the plate at such a high rate of flow that dissemination is prevented, however, such measures entail the disadvantages of requiring a high rate of mercury pumping and high energy consumption therefor, thus making for uneconomical and impractical operation; in addition, the disadvantages from providing a larger amount of mercury for attack by chlorine gas and chlorine dissolved in the electrolyte, whereby current efficiencies are decreased, are encountered. In accordance with my invention, by employing a relatively high cathodic current density as compared to the anodic current density, the mercury flow rate over the vertical metallic cathode supports may be substantially equivalent, based on pounds of mercury circulated per pound of sodium discharged, to that in conventional mercury cathode cells having horizontally disposed electrodes, without increasing the amount of mercury exposed to the action of chlorine, but rather with decreasing it, because the cathode area per unit of production is smaller, and because less mercury is required to be circulated and pumped per unit of production. These two effects are not equivalent but one may be added to the other.

Reference has been made herein to the rate of flow of mercury in units given in pounds of mercury per inch of weir length per minute, because this is a convenient unit for designating the flow-rate of mercury in cases where it is flowing over a weir type edge onto the cathode support. This invention is not limited to distributing the mercury onto the cathode support over a weir; and, successful results may be obtained, in accordance with this invention, by introducing the mercury onto a solid vertical member which enables formation of a continuous mercury film completely surrounding the cathode support. The cathode support may have a pointed top to aid the spreading of mercury to form the continuous film around the cathode support. It is to be understood, therefore, that the mercury flow rates given in pounds of mercury per inch of weir length per minute in my specification and particularly in my appended claims are not to be construed as being limited to maintaining said flow rate by use of a weir; and that, said flow rates are equivalent to those given in units of pounds of mercury per unit of film length, measured horizontally and at right angles to the direction of mercury flow, at a location on the cathode support capable of indicating the typical or average flow rate over the entire cathode support.

*(e) The height of the vertical cathodes*

The production that may be obtained per unit of floor space in a mercury cathode cell having vertically disposed mercury cathodes is a variable which is a direct function of the height of the cathode and it increases directly as the height increases. However, I have found that the height of the cathode support is an important factor, and that for successful operation, it is preferred to limit the height to less than eight feet, preferably between about one-half and five feet. As the height of the cathode is increased, it becomes increasingly more difficult to obtain an alignment of parts providing for a uniform distribution of the mercury, and in addition, the resistance to current passing through the electrodes increases with their length and the current density on the cross-section of the electrode increases (assuming the same current density per unit area on the electrode surface) thereby tending to increase the cell voltage. Still further, with increase in cathode height, the velocity of mercury descending on the cathode supports increases to a point where mercury tends to leave the support surface. I have found this height to be between about four and five feet, on a smooth support. This invention contemplates greater height cathodes by providing surfaces whereby the descension of mercury is slowed down. Also with increase in cathode height the volume of chlorine passing per unit area of brine cross-section increases thereby tending to increase the voltage of the cell and to favor attack of the amalgam by chlorine. By operating in accordance with my invention at rapid upward flow of brine between the electrodes, the removal of chlorine is favored, thereby allowing for a greater cathode height at a given current density, voltage drop and current efficiency.

A particular feature of the cells of this invention is that they have a high ratio of both height and cross-sectional area effective for electrolysis; for example, in a cell of this invention, about 75 per cent of the overall height of the cell is effective for electrolysis, and, about 75 per cent of the total cross-sectional area occupied by the cell is effective for electrolysis.

*(f) Cell temperature*

I have found that the cell height which can be economically employed depends upon the cell temperature and that for successful operation of a vertical mercury cathode cell having cathodes between about one and five feet in height, a temperature above about 70 degrees centigrade and below about the boiling point of the electrolyte should be maintained. The temperature at which the cell is to be operated may be maintained by various means; however, it is preferred to maintain said temperature by providing a cell design which favors autogenous maintenance of the operating temperature above about 70 degrees centigrade, by providing vertically disposed electrodes arranged compactly in a container having a maximum electrode surface per unit of cell surface exposed to the atmosphere. The main factors which must be considered in such a design are the height of the electrodes, the surface area of the electrodes, the shape of the outside container, the number of electrodes to be housed in the container and the amperage for operating the cell. The cells of this invention provide for considerably greater production per unit of external surface area on the container, than cells proposed heretofore having a flowing liquid cathode capable of economical operation. For example, a cell of this invention may be successfully operated having a capacity of 330 amperes per square foot of external surface area which is equivalent to 22 pounds of chlorine per day per square foot of external surface area. Alternatively, the cell temperature may be maintained in an electrolytic cell not having a design providing for autogenous maintenance of temperature, by merely introducing sufficient steam into the electrolyte. The cooling effects obtained by evaporation of water from the electrolyte will prevent the cell temperature from increasing above the boiling point of the electrolyte.

(g) Cell current efficiency

Current efficiency is increased by proceeding in accordance with the findings of my invention, i. e., by effecting the electrolytic decomposition of alkali metal halide brines at vertically disposed flowing mercury cathodes at temperatures above about 70 degrees centigrade and below about the boiling point of the electrolyte; and, by maintaining a rapid upward flow of electrolyte between the vertically disposed electrodes during the decomposition. Also, I have found that, the optimum temperature at which the decomposition is effected and the optimum rate of flow of the electrolyte, for maintaining high current efficiencies, are functions of the height of the vertically disposed electrodes. In addition, I have found that various other factors which are primarily concerned with decreasing the voltage requirements for mercury type vertical cathode cells, also allow for the realization of significant improvements in current efficiencies, for example, by effecting the decomposition at high cathodic current density and low anodic current density, and, by maintaining the rate of flow of mercury at a controlled rate, improved current efficiency is favored, as will be discussed more fully hereinafter.

(h) Cell voltage

Voltage requirement necessary for effecting the decomposition is decreased by proceeding in accordance with the findings of my invention by maintaining a high cathode current density while simultaneously maintaining a low anodic current density. Another significant factor in accordance with my invention for decreasing the voltage requirement is to provide for a continuous downward movement of the flowing mercury cathode on a vertically disposed supported member of highly conductive material. In addition, factors primarily concerned with improved current efficiency also favor decreased voltage, for example, by effecting the decomposition with temperatures above 70 degrees centigrade, by maintaining a controlled mercury flow rate, and, by providing for rapid upward flow of the electrolyte between the vertically disposed electrodes, further improvement in decreasing the voltage requirements are also realized.

Therefore, my invention includes the steps or combinations of steps which comprise effecting the electrolytic decomposition of alkali metal halide brines at a vertically disposed descending mercury cathode at temperatures above 70 degrees centigrade and below the boiling point of the electrolyte, while maintaining rapid upward flow of the electrolyte between said vertically disposed electrodes during said electrolytic decomposition.

V. THE GRAPHS

Figures 12, 13, 14, 15, 16, 17, 18 and 19 are graphs which further illustrate the effects of variations in the factors discussed herein on cell current efficiencies and cell voltages. The graphs were plotted from data assembled primarily by operating electrolytic cells embraced within the scope of my invention, in a manner after that already described above, except for curves representing the prior art which are given for ready comparison.

Figure 12:
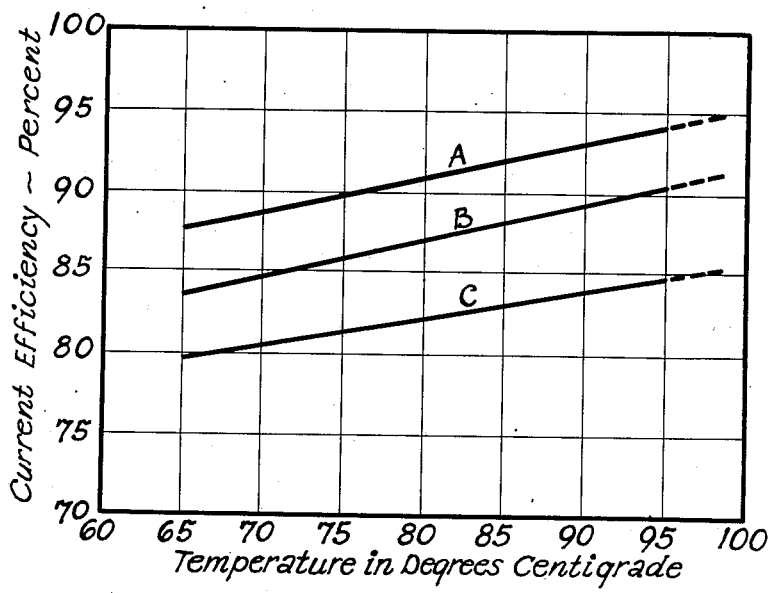
Figure 12 is a graph showing the effect of varying cell temperature on current efficiency.

Figure 12 is a plot of per cent current efficiency as a function of cell temperature, measured as the temperature of the electrolyte in degrees centigrade maintained within the cell. The data for plotting the curves in Figure 12 were accumulated by operating the cell illustrated in Figure 1, at an electrolyte concentration of 270 grams of sodium chloride per liter, with the cathodic current density being maintained between about 300 and 700 amperes per square foot, and, the anodic current density being maintained at about 100 amperes per square foot; it being noted that such variations in cathodic or anodic current density, did not affect the position of these curves. Curve (A) is a plot at a mercury flow rate between about seven to twelve pounds of mercury per tube per minute, which is equivalent to a weir overflow rate of about 2.7 to 4.6 pounds of mercury per inch per minute; curve (B) is a plot at a mercury flow rate of fifteen to seventeen pounds of mercury per tube per minute, and, curve (C) is a plot at a mercury flow rate of twenty to thirty pounds of mercury per tube per minute.

Statements found in the literature indicate that operation of mercury cathode cells at elevated temperatures will give low current efficiencies, and it is probable that these statements are based on the fact that sodium amalgam is decomposed with water more readily at elevated temperatures, outside of electrolytic cells. (See Allmand, Principles of Applied Electrochemistry, page 398 (1924).) However, contrary to this, I have found that when operating in accordance with my invention, including operation at elevated cell temperatures approaching the boiling point of the electrolyte, there is no deleterious effect of increased hydrogen content in the chlorine, this being a direct measure of the attack of water on the sodium amalgam.

The cell or brine temperature also has an important effect on the current efficiency in vertical mercury cathode cells of the type described; presumably because said elevated temperatures tend to reduce the solubility of chlorine in the brine, thereby minimizing attack of the amalgam by chlorine dissolved in brine, whereby loss of current efficiency is reduced. The curves given in Figure 12 indicate this effect, and also show that it is advantageous to maintain the cell temperature as high as possible, the practical upper temperature limit being dictated by the evaporation of water from the brine at its boiling point. However, this invention contemplates the maintenance of cell pressures above atmospheric, in order to realize still higher cell current efficiencies, and lower voltage. Under these conditions the temperature of the electrolyte will approach, as the upper limit, the boiling point of the solution corresponding to the pressure. In addition, Figure 12 shows that in accordance with my invention more than 95 per cent current efficiency may be realized by maintaining the cell temperature at about 98 degrees centigrade.

Figure 12 also shows that in accordance with my invention, it is advantageous to maintain a mercury flow rate of between seven and twelve pounds of mercury per tube per minute, however, this is more clearly shown by Figure 16 which will be discussed in detail hereinafter.

Figure 13:
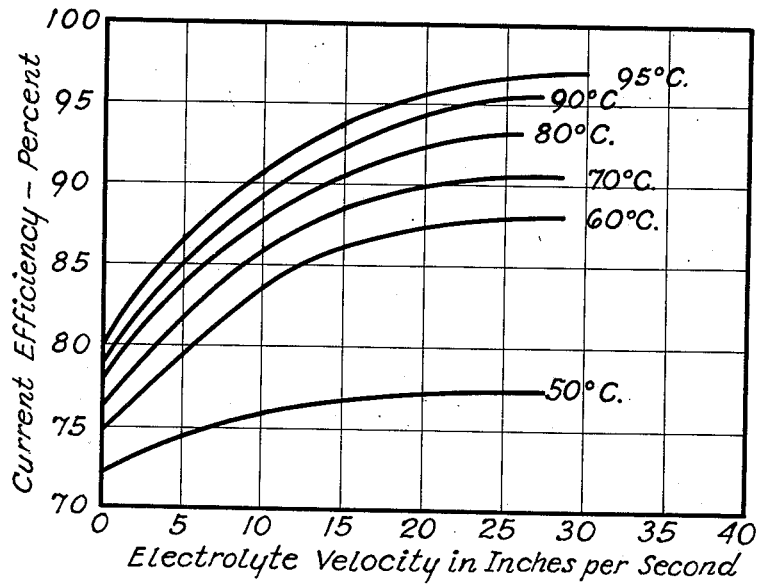
Figure 13 is a graph showing the effect of varying brine velocity on current efficiency.

Figure 13 is a plot of per cent current efficiency as a function of electrolyte velocity, measured in inches per second of electrolyte traversing a given distance of linear inter-electrode space per minute. The data were accumulated at various temperatures from 50 to 95 degrees centigrade and separate curves were plotted at each such temperature as illustrated by the graph. The data for plotting the curves in Figure 13 were accumulated in-part by varying the electrolyte flow rate in a single tube vertical mercury cell embodying the features of this invention having a ratio of active anodic to cathodic area of 2.6, but primarily designed to permit such variations and measurement thereof. The data were also taken in-part from the same cell used for accumulating the data given in Figure 12.

The curves given in Figure 13 indicate that increasing electrolyte flow rates within the range investigated result in an increase in current efficiency at any given temperature, and that, at a cell temperature of 95 degrees centigrade and an electrolyte velocity of twenty inches per second, the cell current efficiency realized was more than 95 per cent. The curves in Figure 13 indicate, by extrapolation, that still higher current efficiency might be obtained with still further increases in electrolyte flow rate; however, the plots do not give basis for predicting whether the curves would approach 100 per cent asymptotically, or, whether a maximum would be reached followed by a decline.

It has been found that by embodying the design features of my invention disclosed herein, especially by providing a sufficiently large space for return of electrolyte from the top of the cell to the bottom of the cell, as illustrated in Figure 2, as the space 25 between the anodes 7 and the shell 26 of the cell, that electrolyte velocities as high as twenty inches per second may be achieved endogenously, i. e., without employing a mechanical pump in an external piping circuit, or otherwise. The main force which motivates and maintains electrolyte velocities of this order of magnitude is presumably derived from the "air lift" effect of the chlorine evolved at the anodes and ascending to the top of the cell through the inter-electrode spaces or channels 20 between the anodes 7 and cathodes 10, thereby forcing the brine to the top of the cell at a rapid rate, coupled with the provision which allows for return of electrolyte to the bottom of the cell. Electrolyte velocities greater than those which can be obtained by proper design of the cell may be had by employing a pump for the electrolyte in an external piping circuit and controlling the flow of electrolyte by a valve.

Figure 14:
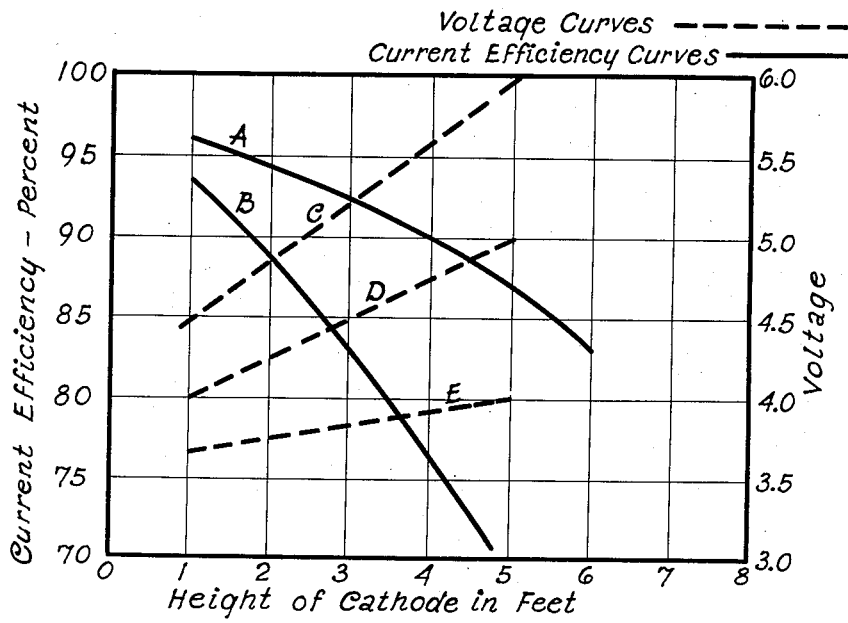
Figure 14 is a graph showing the relationship of varying height of cathodes on current efficiency and cell voltage.

Figure 14 is a plot of curves showing the effect of cathode height, measured in feet, on (1) cell current efficiency, given in percentage, and (2) cell voltage, given in volts. The current efficiency curves are drawn in solid-lines and are read against the percentage values given on the left hand ordinate. The voltage curves are drawn in broken-lines and are read against the values on the right hand ordinate. The curves in Figure 14 were plotted from data obtained by operating similar electrolytic cells embraced within my invention under substantially the same operating conditions, except that the height of their cathodes were varied. Current efficiency curves (A) and (B) were obtained at cell temperatures of 95 and 70 degrees centigrade, respectively; voltage curves (C), (D) and (E) were obtained at 300, 200 and 100 amperes per square foot current density on the anode, respectively.

Relatively high cathodes are desirable because of the greater electrode area that may be obtained per unit of floor space; however, I have found, as illustrated in Figure 14, that there are serious disadvantages to cathodes of great height, in that cell current efficiency is decreased and cell voltage is increased with increased cathode height, and that, there is a practical critical limit of cathode height, above which economic commercial operation may not be realized.

Figure 14 shows that a cell having a cathode five feet high had a current efficiency of 88 per cent and a voltage of 5.0 volts at a current density of 200 amperes per square foot on the anode. Commercial operation at these values would be impractical for most industrial installations; however, this invention contemplates improvements, as evidenced herein, which favor higher current efficiency and lower voltage for such cells having cathodes about five feet high so that practical commercial operation may be realized. For example, this invention contemplates running cells having such cathodic heights under superatmospheric pressure conditions, whereby smaller gas bubbles will be formed, with accompanying improvement in cell current efficiencies. Figure 14 also shows that about 95 per cent current efficiency and a voltage of 4.3 volts were realized with a cell having cathodes two feet high, under the same operating conditions. This represents good practice at present and is within my preferred range of about one to four feet for cathode height.

Figure 15:
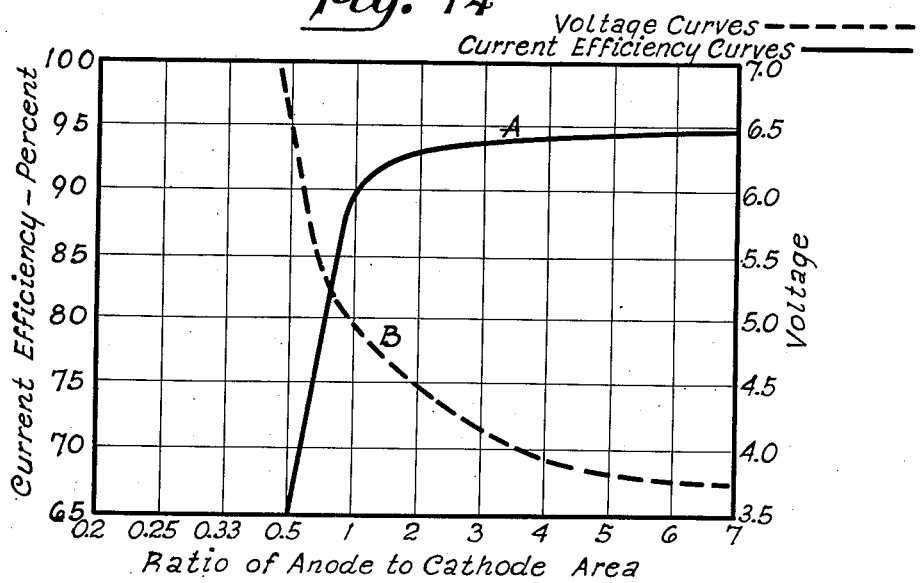
Figure 15 is a graph showing the relationship of varying ratio of anodic to cathodic area on cell voltage and current efficiency.

Figure 15 is a plot of the effect of varying the ratio of effective anodic to cathodic area on current efficiency and voltage. Curve (A) is the current efficiency line and is read against the values on the left hand ordinate; curve (B), the broken-line, is the voltage curve and it is read against the values on the opposite ordinate. The data for these curves were accumulated by operating cells embraced within the scope of my invention, similar except for differences in the ratio of effective anode to cathode area, under comparable operating conditions, approximately as follows: cathode height of between one-half and two feet; cell temperature 95 degrees centigrade; electrolyte concentration 250 grams per liter sodium chloride leaving cell; amalgam concentration 0.06 per cent sodium; current density 400 amperes per square foot on the cathode; anode to cathode spacing about one-quarter inch.

From the curves in Figure 15, it is apparent that as the ratio of active or effective anodic to cathodic area is increased, the current efficiency is increased, and that, as said ratio is increased the voltage decreases.

It would appear, therefore, that the ratio should be increased without limit, however, I have found that the maximum upper ratio limit of anode to cathode area being economically practical and giving successful performance is at about ten to one and that the minimum ratio is above one to one, with a ratio between about two to one and six to one being preferred. The maximum upper limit of ratio of anode to cathode area is primarily conditioned by the following factors: amount of anode surface economical to use; maximum distance between cathode and anode that can be tolerated; electrode designs and shapes which minimize gas blanketing; and, by cathode size which is limited by mechanical strength and current carrying capacity.

Figure 16:
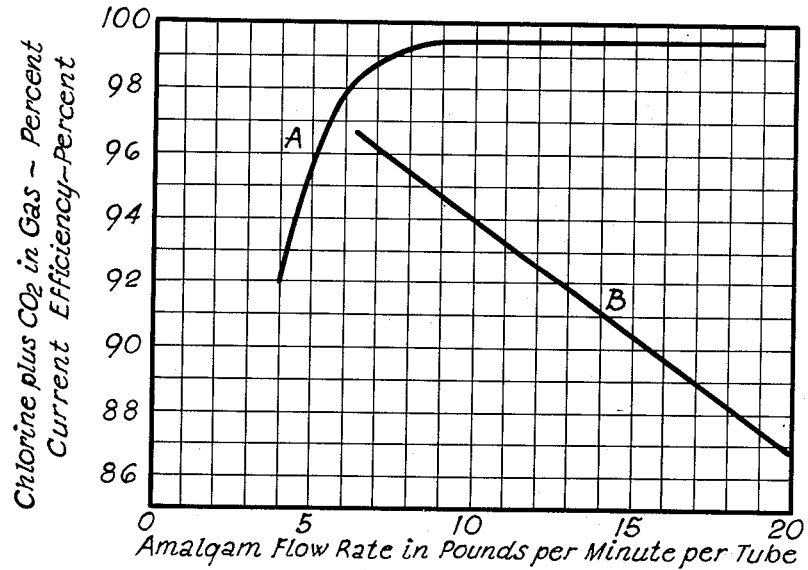
Figure 16 is a graph showing the effect of varying mercury flow rate on current efficiency and gas analysis.

Figure 16 is a plot of curves showing the effect of varying the mercury flow rate, (over the tubular cathode supports of the cell illustrated in Figure 1) measured in pounds of mercury per minute per tube, on (1) chlorine gas analysis and (2) current efficiency. Curve (A) is the gas analysis curve, and, curve (B) is the current efficiency curve; both curves are read against the percentage values given on the left hand ordinate. The data for these curves were accumulated under approximately the following conditions: cell temperature 90 to 95 degrees centigrade; electrolyte concentration 270 grams per liter sodium chloride; and current density of 300 to 700 amperes per square foot on the cathode; it being noted that there was no apparent effect on these relationships due to varying the operating current within the limits indicated.

Figure 16 shows that at very slow flow rates, such as five pounds of mercury per minute per tube, there is incomplete coverage of the cathode supports by mercury and as a result the gas analysis is low in chlorine and high in hydrogen. Figure 16 also shows that as the mercury flow rate increased the gas analysis improved, but that there is a decrease in current efficiency with increased flow rate. This is indeed unexpected, and it was surprising to find a relatively narrow range of between about six and twelve pounds of mercury per tube per minute as being suitable for satisfactory operation, with between about seven and ten pounds of mercury per tube per minute being the preferred range.

Figure 17:
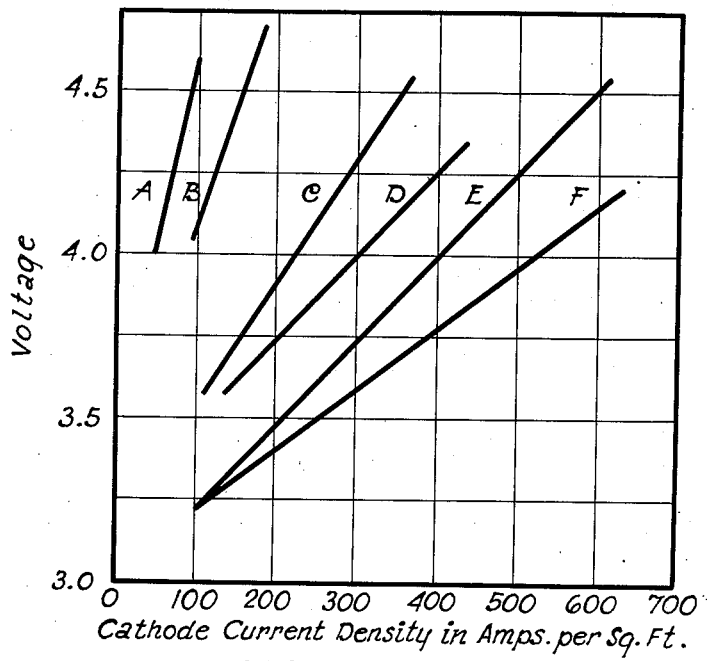
Figure 17 is a plot of cathodic current density against voltage.

Figure 17 is a plot of curves showing the relationship of voltage as a function of cathode current density measured in amperes per square foot; the graph also shows how this relationship varies with varying ratio of anode to cathode area. The data were accumulated by operating vertical type mercury cells, having different ratios of effective anode to cathode area under similar conditions, approximately as follows: cell temperature 50 to 95 degrees centigrade; electrolyte concentration 270 grams per liter sodium chloride; and, anode to cathode spacing 0.25 inch. For convenience of comparison, comparable data for a successful horizontal mercury cell is also plotted. Curves (A), (B), (D), (E) and (F) are plots of this relationship for vertical cells having ratios of effective anode to cathode area of 0.45, 0.85, 1.55, 3.5, and 6.5, respectively, with curve (C) representing a plot of this relationship for a successful horizontal mercury cell having the customary ratio of effective anode to cathode area of 1.0, i. e., for a cell having effective anode and effective cathode areas approximately equal.

From the curves in Figure 17, it is apparent that the ratio of effective anode to cathode area is a significant factor in determining the slope of the lines in this graph; the plots in Figure 15 show, in part, the relationship of the slope of these lines against current efficiency.

Figure 18:
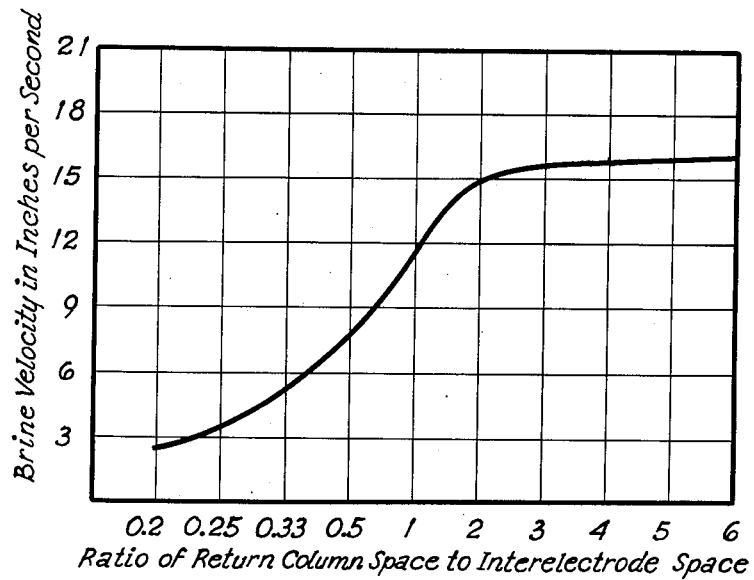
Figure 18 is a graph showing the effect of varying the ratio of return column space to inter-electrode space on brine velocity.

Figure 18 is a graph showing the effect of varying the ratio of return column space to inter-electrode space on the brine velocity, which is given in inches per second, in electrolytic cells of this invention which are designed for endogenous maintenance of electrolyte velocity at rates sufficiently high for the realization of high current efficiencies.

Figure 19:
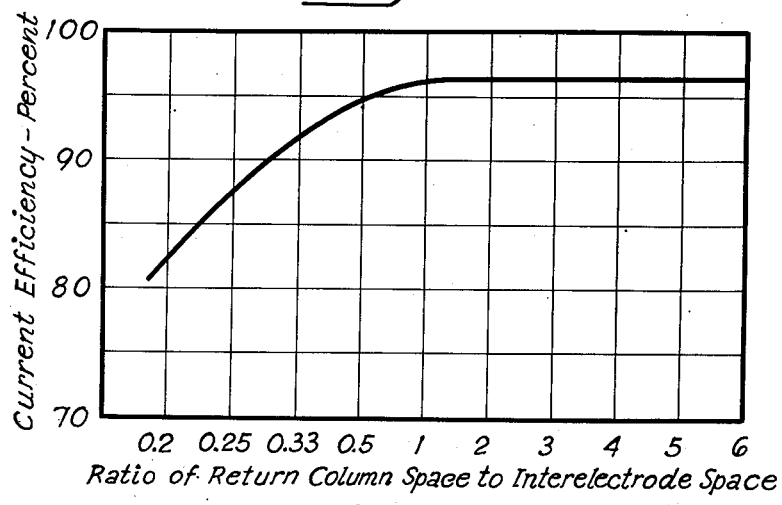
Figure 19 is a graph showing the effect of varying the ratio of return column space to inter-electrode space on cell current efficiency.

Figure 19 is a graph showing the effect of varying the ratio of return column space to inter-electrode space on current efficiency, in cells designed for endogenous maintenance of electrolyte velocity in accordance with this invention. The data for these curves were accumulated by operating various cells having different ratios of return column space to inter-electrode space under comparable conditions.

These curves indicate that in order to realize high cell current efficiency above about 90 per cent, the ratio of return column space to inter-electrode space, in those cells of this invention providing for endogenous maintenance of high electrolyte velocity, must be at least one to one and preferably at least two to one.

VI. THE PARTS OF THE CELL

(a) The top, its assembly and a modification

Referring to Figure 3, which is a section of the top 2 of the cell taken along the line b—b in Figure 1: This figure gives a detailed construction of the top of the cell, illustrating the method for securing an anode 7 into frame 22. The frame includes anode posts 8 which are preferably made of copper and are welded to the sides thereof in the position indicated so that during assembly of the cover, as described below, molten lead may surround that part of the anode posts 8 which are embedded in the frame thereby providing for good electrical contact between the anode 7 and the anode posts 8. The frame also includes lugs 21 which are welded to the sides thereof and are used for obtaining a grip when removing the top of the cell during disassembly. The anodes are provided with holes 23 so that when securing the anodes into the cover, the molten lead 6 may seep into said holes and on hardening, make a solid, strong connection. The inner surface of the cover is protected from chemical and electrical attack by being coated with a layer of bitumen 18.

When assembling the anodes into the cover, it is important to make certain that they project perpendicular and vertically downward from the top or cover, and in addition, proper spacing and alignment of the anodes must be provided for during assembly so that they surround the cathode supports. This assembly and alignment of parts is readily accomplished by holding the anodes in the proper position over the frame of the cover just short of touching the flat surface 24 and pouring molten lead into the frame whereby the anodes are secured in the proper position when the lead hardens.

The top 2, which includes the completely assembled cover including anodes, is fitted to the body of the cell through a gasket 16 to make a pressure-tight fitting. The weight of the entire assembly, which bears on the rim of the body through the gasket, is sufficient to make the pressure-tight fitting; however, if desirable, the top may be secured to the body by ordinary mechanical means for such purposes such as C-clamps, etc.

A simpler construction for the top may be had by simply securing the anode blades to a flat sheet of steel, conforming in shape to the cross-section of the body of the cell, with a conductive adhesive plastic material which is just becoming available on the market.

(b) The bottom including mercury feed means

Figure 4:
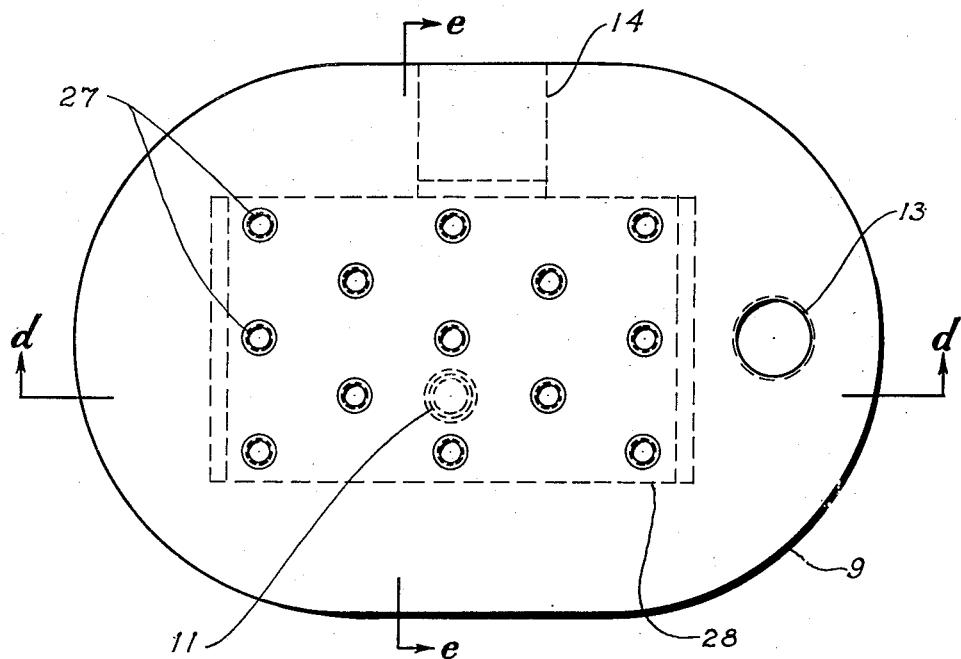
Figure 4 is a plan view of the bottom of the cell taken along the line c—c in Figure 1.
Figure 5:
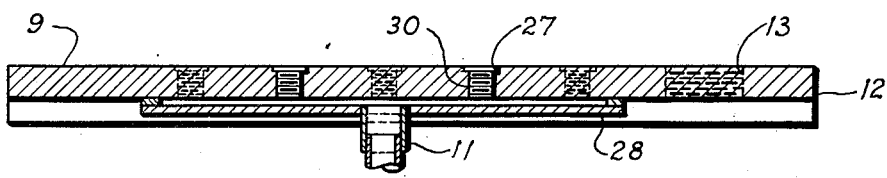
Figure 5 is a section of the bottom of the cell taken along the line d—d in Figure 4.

Referring to Figure 4 which is a plan view of the bottom of the cell taken along the line c—c in Figure 1; Figure 5, which is a section of the bottom of the cell taken along the line d—d in Figure 4; and Figure 6 which is a section of the bottom of the cell taken along the line e—e, Figure 4: These figures show preferred embodiments of this invention and illustrate the detailed construction of the cell bottom, particularly showing the manifold mercury feeding means 12 and the cathode base plate 9 to which the cathode supports 10 are assembled. Mercury or denuded sodium amalgam is introduced into the cell through inlet 11 which is positioned so that the mercury is not received in the manifold directly below the cathode base plate holes 30 which communicate with the hollows in the cathode tube supports, whereby uneven distribution of the mercury through and over each tubular cathode support is prevented. The tubular cathode supports, to be described in detail in connection with Figures 8 and 9 are preferably and conveniently made from ordinary steel pipe, and are adapted to fit into the cathode support seats 27 so that the tubes project vertically and substantially perpendicular to the cathode base plate.

The cathode support seats 27 are in substantially the same plane and are superimposed on threaded holes 30 which are adapted to receive the tubular cathode supports 10, the lower extremities of which are also threaded and provided with a shoulder 29, whereby vertical alignment perpendicular to the cathode base plate 9 is easily and readily obtainable during assembly of the cathode tubes into the base plate. Assembly of these parts merely consists of screwing the threaded end of the cathode tubes into the threaded holes of the cathode base plate, thereby allowing for unobstructed even flow of the mercury or amalgam which is introduced into the cell from the manifold into and over the hollow tubes and eventually down on their outer surface, with a minimum of resistance to flow. It will be noted that a particular feature of this invention is a cathode support assembly, which provides for both conveying and supporting the liquid cathode material, comprising a plurality of tubes vertically disposed on the base plate, with the base plate having a conduit for the liquid cathode material in communication with the vertical tubular conduits, so that mercury is conveyed in a continuous stream to the top of each tube and thence into the zone of electrolysis, with the cathodically active element of the zone of electrolysis comprising the vertically disposed liquid cathode material supported on the outside surface of the tubes and the horizontally disposed liquid cathode material supported on the top surface of the horizontal conduit.

Figure 6:
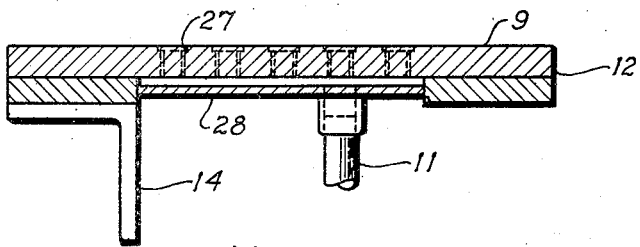
Figure 6 is a section of the bottom of the cell taken along the line e—e in Figure 4.

Figure 5 illustrates the location of the amalgam outlet 13 which is shown as being threaded to receive ordinary pipe so that connection to the amalgam washing tank, the flushing tank and the decomposer may be readily made, as is further illustrated in Figure 10. Figure 6 shows how electrical contact is made to the cell at cathode post 14. It will be noted that the bottom of the cell is constructed so that it can be readily modified to be used as the cover of another vessel. This modification of my invention is to be described in connection with Figure 10.

The cathode supports of this invention as compared with the cathode support of the conventional horizontal cell have several functional advantages, as disclosed elsewhere herein, and economic advantages. For example, my cathode structure is in the order of magnitude of one-fifth the weight and hence of about one-fifth the cost of the cathode structure used in the conventional horizontal cells of the prior art. The cathode support surfaces used in conventional horizontal cells require accurate machining and careful alignment to insure coverage of the entire surface by the amalgam during operation, whereas, my cathode support surfaces in contact with the amalgam do not require machining or special treatment in order to function properly during operation. This results in substantial savings in original cost and in maintenance costs. A particular advantage of the cathode supports of this invention, including the manifold means for conveying the mercury, is that the holdup of mercury in cells of my design is less than the holdup of mercury in any other designs proposed heretofore. For example, in a 24,000 ampere cell of this invention only 600 pounds of mercury is contained in the cell, which amounts to 0.025 pound of mercury per ampere.

Figure 9 shows a cathode top which is provided with an overflow weir 17 which aids in the even distribution of the mercury over and down the outside surfaces of the cathode supports during operation of the cell. I have found that by "funneling" the cathode support tops as shown in Figure 9 more uniform distribution of the mercury or amalgam down the cathode tubes is realized. The improvement in distribution of mercury by this means is believed to be due to the reservoir effect produced by the "funnel" shaped top and/or else to the fact that the edge of the overflow weir is relatively thin.

(c) The anodes

Figure 11:
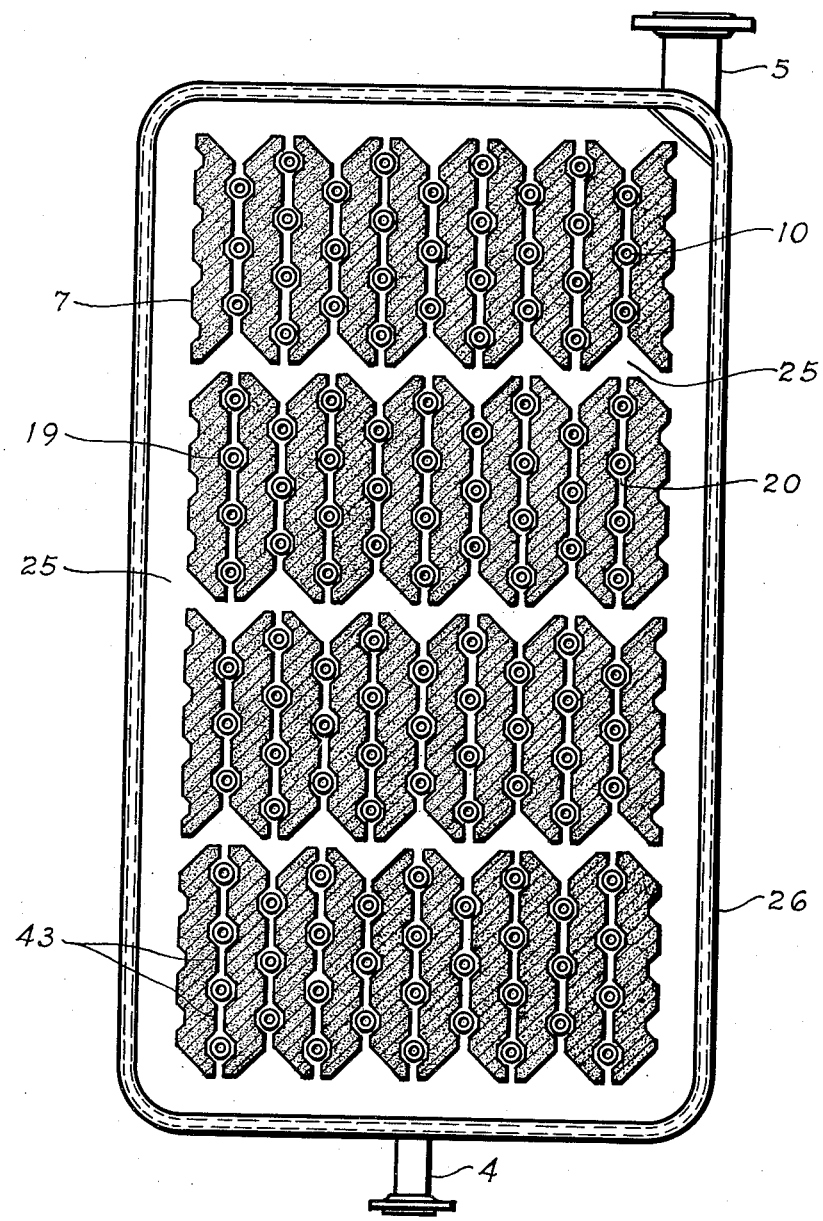
Figure 11 is a plan view of a modified cell shown in Figure 10, with the cover removed leaving the anodes in place, to show the layout of the anodes and cathode supports.

Figure 7 is a perspective view of an anode useful in conjunction with the cell illustrated in Figure 1. The anodes are preferably made of graphite. The anode grooves 19 may be machined into a rectangular piece of graphite or preferably the anodes are extruded in the shapes depicted in the drawings. The grooves are arranged so that, on assembly of the cell top which holds the anodes into the cell, they encompass the cathode tube supports, as is illustrated in Figures 2 and 11 whereby the inter-electrode spaces 19 are provided. The return column space is provided in the cell because in assembly of the cell top into the shell of the cell spaces are allowed for between the outside anode surfaces and the shell of the cell whereby circulation of the electrolyte is obtained in accordance with my invention. This space is also provided by arranging anodes in groups such that there is a space allowed for between anode ends of said groups thereby providing for return column space between the ends of anodes in adjacent groups, as illustrated in Figure 11. The bottom of the anodes do not touch the base plate 9 but rather during operation of the cell, the bottom of the anodes and the amalgam flowing on the base plate 9 act as effective electrodes.

The anode tops extending above the brine level in the cell are preferably treated before assembly in the cell cover so that gas or liquid seepage into the cover is prevented thereby prolonging the useful life of the anodes. It will be noted that cells of my invention are preferably designed so that replacement of anodes, which are worn out due to prolonged usage, is facilitated.

(d) The electrode assembly and arrangement

The arrangement of electrodes as shown in the drawings have a number of specific advantages. The diameter of the cathode support tubes are between three and one-half inches but preferably are about one inch. The inter-electrode spacing between anode and cathode is preferably about 0.25 inch; however, as the graphite anode groove or anodically active part of the anode is worn during electrolysis, the inter-electrode space will increase up to about one and one-half inches. Wear of the anode is most rapid on areas closest to the cathode, hence with usage and operation of the cell, the anode groove surrounding the cathode support tends to become cylindrical in shape and to gradually increase in diameter. If on assembly of the anodes over the cathodes there is any misalignment of parts, the wear of the anode grooves or anodically active strips will automatically tend to form a cylinder, concentric with its cathode tube, because the anodes are worn in arcs having a common center with the center of the cathode tube. The surface area of graphite on the arc increases with wear, thus tending to increase the anode surface of opposite semi-cylindrical strips or grooves encompassing a cathode. Hence, as the graphite anode is worn, there is a much lower rate of increase in cell voltage with time than there would be if the anode and cathode were flat surfaces of equal area. Because of this, it is not necessary to move the graphite closer to the cathode to compensate for anode wear as is done in many cells of the prior art. Also, the volume rate of electrolyte circulation in said cell increases with continued electrolysis because of such anode wear since frictional resistance to flow decreases. Anode wear can be compensated for by replacing cathode support tubes by tubes of larger diameter.

In the illustrated construction, the anodes are preferably two to three inches in thickness measured between the planes of opposite outer flat surfaces. The thickness used is dependent upon several factors: on the one hand, thicker blades would tend to decrease the voltage drop in the blade, to decrease the number of graphite renewals per unit of time, and, to decrease percentage waste of graphite in the parts remaining when the graphite is renewed; whereas on the other hand, thinner blades would tend to reduce the investment in graphite, to reduce the cell weight, to reduce the cost of cell construction, and, to reduce floor space requirements. The inter-anode spacing, i. e., the space between the planes of the outer surfaces of adjacent anode blades is preferably one-half to one inch. Further increase in the size of these inter-anode spaces would tend to increase the cost of cell construction and increase floor space requirements, with a given size diameter cathode tube.

The number of cathode supports to be placed in a row per anode, to make an electrode element, depends upon the size of cathodes, the spaces between anodes, and, the current density at which it is desired to operate the cell. At least two tubes and preferably about three or four tubes are preferred for each row in the design illustrated. The space between the ends of the graphite blades of an electrode element is important for permitting downflow of the brine after the chlorine bubbles have been separated from the electrolyte at the top of the cell. A space averaging about three inches between adjacent electrode elements is preferred.

The pattern of anodes with respect to cathodes depicted in the drawings has particular advantages. Considering a part of the cross-section of an anode blade encompassed by three cathode tubes, it will be noted that the cathode tubes are at the apex of a triangle which is substantially equilateral with one tube on one side of the blade and two tubes on the opposite side. This staggered arrangement provides for advantageous use of the graphite since the semi-cylindrical groove formed by wear, having its axis common with the axis of its cathode tube, will not intersect adjacent semi-cylindrical grooves in the same anode blade also formed by wear, until the graphite has been nearly worn out; also the remaining graphite is in the most advantageous shape for use at minimum cell voltage.

VII. THE VERTICAL CELL INSTALLATION

Figure 10 is a perspective view showing one advantageous vertical layout for a mercury cathode cell 1, an amalgam washing means 31, a means for flushing out the mercury cathode cell 38 and a decomposer 33 for converting the sodium amalgam to caustic soda and hydrogen. During operation of the cell, sodium amalgam which is made in the cell, is continuously withdrawn out of outlet 13, and continuously washed in tower 31, said tower being made and packed with non-conductive material. A continuous stream of washing water is flowed through the tower countercurrent to the descending stream of amalgam. The washed sodium amalgam is piped 32, to the decomposer 33 which is packed with conductive material, such as old broken graphite anode blades, whereby decomposition of the sodium amalgam to hydrogen and a predetermined concentration of caustic soda is effected by introducing a controlled amount of water into the decomposer through inlet 34. The hydrogen and caustic soda so produced are separately recovered at hydrogen exit 35 and caustic outlet 36. The denuded mercury, which may still contain a small percentage of sodium, is withdrawn from the decomposer from outlet 37, and recycled back to the cell through a pump 42.

During operation of the cell, deposits of impurities accumulate on top of the amalgam surface in outlet 13. These impurities are retained on the amalgam surface because their specific gravity is much lower than the specific gravity of the amalgam. These impurities, when permitted to remain in the cell, cause effects which result in undesirable performance of the cell. By providing the flushing tank 38 as shown in Figure 10, the impurities may be readily removed from the cell, without interruption of operation, by merely opening valve 39 until the impurities are drained out with the amalgam and brine which are so withdrawn. The withdrawn amalgam, brine and impurities are separated in the flushing tank by decantation. The amalgam and brine are then recycled to their respective conduits through amalgam outlet 40 and brine outlet 41.

Figure 10 illustrates particular features of my invention which comprise, the preferred vertical layout as illustrated, wherein the cell bottom is used as the cover for the decomposer, and wherein the flushing tank is vertically disposed underneath the cell.

VIII. MODIFICATIONS

In the foregoing specification, and drawings appended hereto, preferred embodiments of my invention have been given. It is to be understood, however, that various modifications are included as falling within the intent and spirit of my invention.

The vertical cathode support need not be cylindrical in shape as illustrated in the drawings. Oval, hexagonal or other such similarly shaped tubular members are suitable for use as the vertical cathode support members. The top ends of the tubular cathode supports are illustrated as having a flat weir type edge. The top end of the tube may be notched at spaced intervals on the periphery to aid in the distribution of the liquid cathode material. Alternatively, the top ends of the vertical tubular cathode support members may be constructed of porous metal through which the liquid cathode material may flow for distribution on the outside surface of the tube. This invention contemplates employing solid vertical wires, rods, or prisms, or other similarly shaped members, which have the liquid cathode material introduced on top of such members, thence descending downward over the members, flowing to a horizontal base plate and then to an outlet where it may be removed from the cell. One means of effecting such a top feed of liquid cathode material includes providing a conical tip at the top end of the rod, with feed tubes fitting loosely over the tips for introducing the liquid onto the rod. The feed tubes may include orifices to control the rate of mercury flow, or, the space between the tube and the cathode support may be arranged to make an orifice of the proper size to control the rate of mercury flow. This means may be further modified to favor the spread of liquid on the support by revolving the loosely fitted feed tubes. Another means for obtaining a top feed of liquid cathode material over a solid rod like support member comprises a rotating jet actuated by the discharge of liquid from the jet onto the support. The vertical solid rod like cathode supports may also be covered with liquid cathode material by providing a well of liquid cathode material below the anodes and by causing the rods to be mechanically lowered into said well and raised after wet with liquid cathode into position between the anodes. This invention contemplates modifying the vertical tubular members shown in the cells illustrated by substituting cables or wires fitted on driving and idling pulleys in place of the tubes, said members being mechanically and continuously passed between the anodically active surfaces; the members being covered by liquid cathode material by dipping into a well provided at the bottom pulley upon which the cable is revolving.

The anode assembly may be constructed from a solid graphite block having vertical columns drilled therein concentric to the vertical cathode supporting members. Such anodes may be supported and connected electrically in the cell by members entering from the sides, top or bottom of the cell. The return column space for electrolyte in such a graphite block cell can be provided by drilling large vertical holes parallel to the cathode support holes through which electrolyte may circulate. In such a design, the return column space for electrolyte may preferably be provided in spaces between the graphite block and the shell of the cell. The anode assembly may be a solid graphite block which also serves as a cell body or container for the electrolyte. In this design, the return column space for the electrolyte may be in a passage provided in the graphite block or through a conduit outside of the cell. By having an external conduit for electrolyte circulation exceptionally easy control for regulating the rate of electrolyte flow may be realized since a pump may be conveniently placed in the required piping circuit. The anode assembly may also consist of two or more separate graphite blocks, as just described, with transverse spaces provided between them to act as return column spaces for electrolyte. These may be in a separate container or the plurality of graphite blocks may form a portion of a container. It is not necessary that anode blades be grooved as illustrated in the appended drawings; the anodes may be flat blades when new, since during operation of the cell, vertical grooves similar to those illustrated will be worn in the graphite. The anode assembly may comprise vertical cylindrical graphite tubes surrounding the cathode support, assembled in bundles or groups of bundles, and provided with return column space for electrolyte. Various designs of anodes may be employed in the cells illustrated in the drawings. For instance, the cross-section of the anode blades may be square and so assembled as to form a checkerboard design or the cross-section of the anode blade may be that of a hypocycloid of four cusps and so arranged to form cylindrical columns concentric with the axis of the cathode support. It is to be understood therefore, that the anode designs which may be employed in the cells illustrated may vary widely and that in order to get satisfactory operation in accordance with this cell, it is only necessary for an anodically active surface to substantially encompass the cathode.

In the appended drawings, the graphite anodes are illustrated as being suspended and conductively connected by being cast in lead, or other low melting metal, together with the anode terminal post. Alternatively, the top of the cell may be made of chlorine resistant non-conductive material through which the anodes project. In such a design, the electrical connection may be made to the anodes at a point located outside of the cell container. Many different designs for the cell top are contemplated as being useful in this invention. It may be constructed from a metal casing, forging, or plate to which the anodes can be connected in any one of several ways. For example, the plate may have holes or slots adapted to receive the ends of the graphite anode blades; and/or, the plate may have lugs and the graphite blade may have holes adapted to fit on said lugs. The plate and blades may be fastened together by any suitable means, including a friction fit, or, the use of an electrically conductive thermosetting plastic adhesive. The anode blades may be supported from one or more sides or from the bottom of the cell employing suitable corrosion resistant and electrically insulating sheaths around the graphite or around metal connectors.

In the cells illustrated, the base plate holds the vertical cathode supports in position; it is made of conductive metal and is effective during electrolysis since it becomes covered with liquid cathode material during operation. It is of course, advantageous to employ the top surface of the horizontal base plate in electrolysis, however, it may be constructed of non-conductive material such as concrete, plastic, rubber or ceramic and in such a case a grid work of pipes for conveying the liquid cathode material to the vertical tubular cathode supports may be embedded in such non-conductive material. A modification of this invention contemplates providing the horizontal surface of the cathode base plate which is effective in electrolysis, with grooves for conveying the liquid cathode material to the liquid cathode material outlet so that a more rapid flow rate may be realized in order to reduce the retention time of the liquid cathode material in the cell. Although the use of relatively smooth surfaces on the cathode support tubes has been illustrated, i. e., smoothness such as obtained by use of ordinary hot rolled steel pipe or hot drawn seamless tubing, the surface of the cathode support may be grooved or otherwise roughened to decelerate the flow of mercury down the tube.

The cells illustrated in the drawings are designed to operate at substantially atmospheric pressure, there are however, advantages in operating at pressures greater than atmospheric because the size of gas bubbles at such higher pressures tend to be decreased and this results in a lower voltage for the cell or conversely higher production may be obtained with the same voltage.

The cells of this invention are particularly suitable for effecting the electrolysis of alkali metal chloride brines, especially sodium chloride and potassium chloride brines. They are equally suitable for effecting the electrolysis of other saline solutions and particularly for solutions of salts of metals soluble in mercury having anions which form gaseous products at the anodes, for example, solutions of zinc chloride, copper chloride, tin chloride may be effectively electrolyzed in accordance with this invention.

The cells illustrated in the drawings have been designed for maintenance of endogenous circulation of electrolyte within the cell in accordance with a particular feature of this invention. The high rates of electrolyte circulation so obtained may be further increased by supplementing a pump within the brine circulation system. Alternatively, the brine may be circulated outside of the cell through a pump and through a salt bed to increase the electrolyte concentration.

This invention, therefore, is not to be construed as limited by the foregoing specification and drawings except as defined in the appended claims.

I claim:

1. An electrolytic cell for the decomposition of alkali metal chloride in an electrolyte comprising a container for the electrolyte, a cathode support assembly comprising a plurality of tubular cathode support members, and an anode assembly therein containing anodes providing a plurality of elongated vertical anodically active surfaces positioned opposite each other with an intervening space between them for the electrolyte, said anodically active surfaces comprising a plurality of pairs of vertical anodically active strips which face each other to form two types of interelectrode spaces for electrolyte, which spaces alternate with each other, each space of a first type being positioned to contain a cathode support for vertically flowing tubes of liquid cathode material and to form a space for columns of electrolyte around said cathode, each space of a second type being positioned to form a space for columns of electrolyte between said anodically active strips which are positioned closer to each other than the pairs of anodically active strips opposite the spaces of the first type, the spaces for the cathode and anode columns of electrolyte merging to form a continuous interelectrode space for a sheet of electrolyte which rises vertically along the opposite anode surfaces, said anode assembly being positioned in the container so that there are return column spaces at the vertical edges of the anodes for the down flow of electrolyte, said return column spaces having a transverse sectional area greater than the transverse sectional area of the interelectrode spaces.

2. An electrolytic cell as set forth in claim 1 in which the cathode supports for the vertically flowing tubes of liquid cathode material have a generally cylindrical surface and an outside diameter between about one-half and three inches.

3. An electrolytic cell as set forth in claim 1 in which anode surfaces adjacent said cathode supports for vertically flowing tubes of liquid cathode material are grooved to predetermine the spacing between the said anode and cathode surfaces.

4. An electrolytic cell as set forth in claim 1 in which there is a manifold at the bottom of the container for supplying liquid cathode material to vertical tubular cathode supports for said vertically flowing tubes of liquid cathode material.

5. An electrolytic cell for effecting the electrolysis of alkali metal halide brines comprising a liquid tight vessel having a cover and a bottom, said cover containing a plurality of anodes projecting perpendicularly and downward from the cover, said anodes being spaced in pairs to form vertical chambers traversing the length of said anodes; said bottom containing a plurality of tubes the inner conduits of which are for transporting liquid cathode material to the top thereof, and the outer surfaces of which are smooth for permitting the unobstructed flow of liquid cathode material thereover, said tubes projecting perpendicularly and upward from the bottom, the lower ends of said tubes being connected to and in communication with a manifold in said bottom, said anodes in said cover and said cathodes in said bottom being assembled in the vessel so that an interelectrode space for housing electrolyte is formed between them.

6. An electrolytic cell for the decomposition of saline solutions, comprising a container including an electrode element having a pair of anodically active vertically disposed surfaces opposite each other, said surfaces substantially encompassing each of a plurality of regularly spaced vertically disposed tubular conductive members, said tubular members each having an internal conduit for upwardly conveying and an external surface for supporting a downwardly flowing liquid cathode, the lower ends of said tubular members being connected to and in communication with a manifold within a horizontal conductive plate, the top ends of said tubular members forming weirs for evenly distributing said liquid cathode on the external surfaces of the tubular conductive members.

7. An electrolytic cell according to claim 6 wherein each of said tubular conductive members has an outside diameter between about one-half inch and three inches.

8. An electrolytic cell for the decomposition of saline solutions, comprising a container including an electrode element having a pair of anodically active vertically disposed surfaces opposite each other, said surfaces substantially encompassing each of a plurality of regularly spaced vertically disposed tubular conductive members, said pair of anodically active surfaces and said tubular conductive members defining regularly spaced zones effective for electrolysis, said zones being connected to each other by passages for electrolyte, said passages being defined by a second pair of anodically active surfaces, the pair of anodically active surfaces opposite each other which encompass a tubular conductive member being spaced greater than the anodically active surfaces defining the passages for electrolyte, said tubular members each having an internal conduit for upwardly conveying and an external surface for supporting a downwardly flowing liquid cathode, the top end of each of said tubular members forming a weir for evenly distributing said liquid cathode on the external surface of the tubular conductive member.

9. In an electrolytic cell for the decomposition of saline solutions, comprising a container including an electrode element having a pair of anodically active vertically disposed surfaces opposite each other, said surfaces substantially encompassing each of a plurality of regularly spaced vertically disposed tubular conductive members, said tubular members each having an internal conduit for upwardly conveying and an external surface for supporting a downwardly flowing liquid cathode, the top ends of said tubular members forming weirs for evenly distributing said liquid cathode on the external surfaces of the tubular conductive members: an anode element consisting of a generally rectangular block of graphite having parallel opposite surfaces with a series of parallel vertical grooves on opposite sides of the graphite block which are in respective series staggered with relation to each other, adapted to be positioned in proximity to parallel cathodes to determine the spacing between the anode and cathode surfaces.

10. A cathode support for liquid cathode material in electrolytic cells for the electrolysis of aqueous saline solutions comprising a vertically disposed elongated rigid conductive tubular member having an internal conduit for transporting liquid cathode material throughout its length from the bottom to the top of the support, a weir at the top of said support, which is an integral part of said tubular member, for evenly distributing said liquid cathode material on the external surface of said conduit, said tubular member having a uniform periphery throughout its supporting length, the lower end of said tubular member being connected to and in communication with a manifold in a horizontal conductive plate which is effective for electrolysis and for supporting liquid cathode material in the cell and for feeding liquid cathode material to the internal conduit of said tubular member.

11. A cathode support as set forth in claim 10 wherein the tubular cathode support member has an outside diameter between about one-half inch and three inches.

12. A cathode support as set forth in claim 10 wherein the wall of the cathode is tapered at the top end so that the wall thickness at the top is less than the wall thickness of the major portion of the tubular member.

13. In an electrolytic cell having a plurality of downwardly flowing liquid cathodes and a plurality of opposite vertically disposed anodically active surfaces defining zones for electrolysis, a cathode support assembly comprising a plurality of elongated tubular conductive members, each of said tubular members having open at each end, each of said tubular members having an internal conduit for upwardly conveying and an external surface for supporting a downwardly flowing liquid cathode, said members having a uniform periphery throughout their supporting length and being arranged vertically on a substantially horizontal conductive plate, each tubular member having the lower end of its conduit connected to and in communication with a manifold within said horizontal plate, said plate having a top surface for supporting liquid cathod material, said external tubular surfaces and said top plate surface being in communication with each other so that a continuous sheet of flowing liquid cathode material is formed from the top of each tubular member, down the external surface, and across the top of the horizontal conductive plate.

14. A method for increasing current efficiency in the operation of electrolytic cells for the electrolysis of alkali metal chloride brines between a vertically disposed anode and a vertically disposed mercury cathode descending on a conductive support, which comprises: endogeneously maintaining rapid upward flow of electrolyte by maintaining communication between a column of electrolyte ascending vertically in an inter-electrode space with a descending column of electrolyte in a space outside the zone of electrolysis with the linear velocity of the descending column of electrolyte being maintained less than the linear velocity of the ascending column of electrolyte, said ascending column being maintained at a linear velocity with respect to the electrodes of above about 10 inches per second, and maintaining a temperature of electrolyte above about 70 degrees centigrade and below about the boiling point of the electrolyte.

References Cited in the file of this patent

UNITED STATES PATENTS

| | | |
|---|---|---|
| 661,188 | Nettl | Nov. 6, 1900 |
| 679,477 | Kynaston | July 30, 1901 |
| 733,643 | Gurwitsch | July 14, 1903 |
| 1,374,976 | Allen | Apr. 19, 1921 |
| 2,542,523 | Hirsh | Feb. 20, 1951 |
| 2,598,228 | Cox | May 27, 1952 |

FOREIGN PATENTS

| | | |
|---|---|---|
| 490,911 | Great Britain | Aug. 23, 1938 |